United States Patent
Yen

(10) Patent No.: US 7,588,349 B2
(45) Date of Patent: Sep. 15, 2009

(54) SOLAR-INFRARED-RAYS SENSING GARDEN LAMP

(76) Inventor: Jen-Yen Yen, No. 22, Haojin Rd., Nanxin Village, Puyan Township, Changhua County (TW)

( * ) Notice: Subject to any disclaimer, the term of this patent is extended or adjusted under 35 U.S.C. 154(b) by 136 days.

(21) Appl. No.: 11/965,610

(22) Filed: Dec. 27, 2007

(65) Prior Publication Data
US 2009/0168411 A1 Jul. 2, 2009

(51) Int. Cl.
*F21L 4/00* (2006.01)
*H05B 37/02* (2006.01)
*G08B 13/00* (2006.01)

(52) U.S. Cl. .................. 362/276; 362/183; 362/802; 362/184; 362/20; 315/149; 340/565

(58) Field of Classification Search ............ 362/183, 362/276, 802, 184, 20, 153.1; 315/149, 155; 340/565, 567
See application file for complete search history.

(56) References Cited

U.S. PATENT DOCUMENTS

| 5,155,474 | A | * | 10/1992 | Park et al. | 340/691.5 |
| 5,442,532 | A | * | 8/1995 | Boulos et al. | 362/276 |
| 7,375,313 | B2 | * | 5/2008 | Lee et al. | 250/221 |
| 7,429,827 | B2 | * | 9/2008 | Richmond | 315/149 |
| 7,438,438 | B2 | * | 10/2008 | Sandell | 362/276 |

\* cited by examiner

*Primary Examiner*—Ali Alavi
(74) *Attorney, Agent, or Firm*—Ming Chow; Sinorica, LLC

(57) ABSTRACT

A solar-infrared-rays sensing garden lamp is provided. It mainly comprises a garden lamp body with a control apparatus set inside. The control apparatus charges a power supply via the solar energy in the daytime, and provides power via the power supply in the nighttime. Therefore a infrared rays sensing circuit set on the garden lamp body at a surface thereof can sense omnibearingly in the nighttime. When the infrared rays sensing circuit senses unusual situation, it drives a corresponding lighting unit to illuminate and transmits a triggered signal to the voice control unit for driving a speaker and giving off sounds.

14 Claims, 5 Drawing Sheets

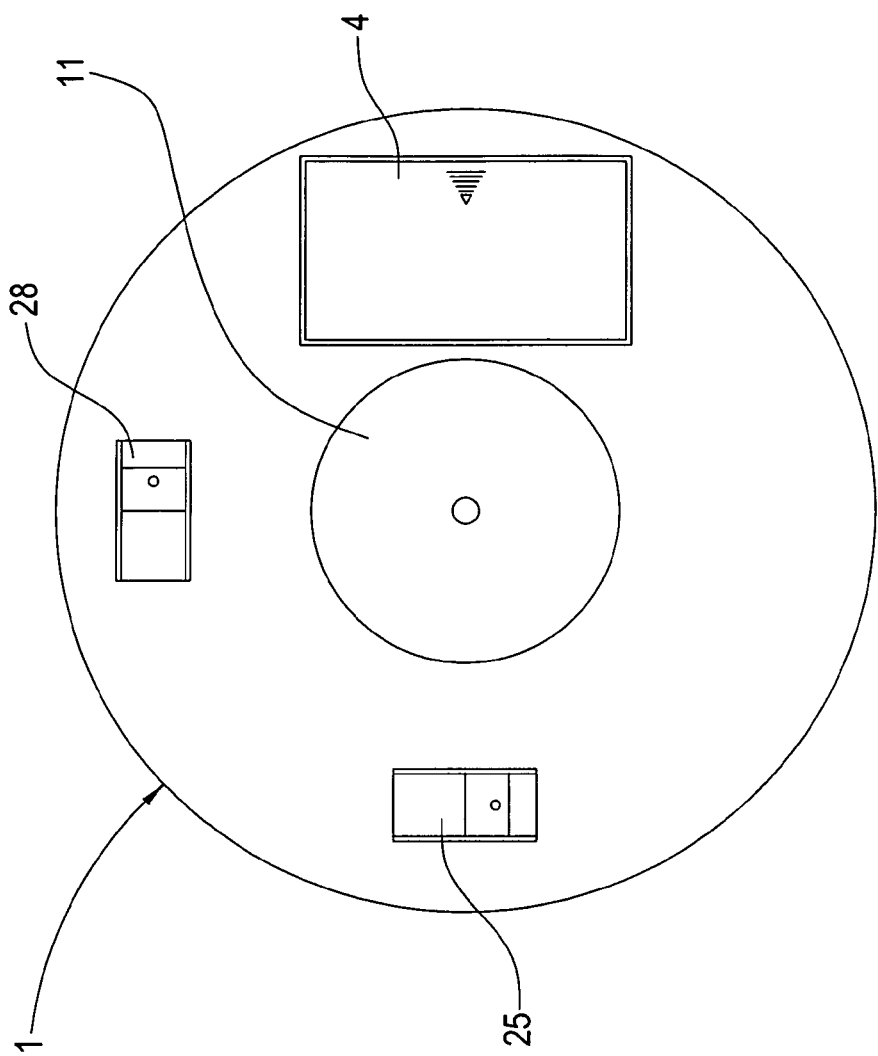

US 7,588,349 B2

SOLAR-INFRARED-RAYS SENSING GARDEN LAMP

BACKGROUND OF THE INVENTION

1. Field of the Invention

The present invention relates to a solar-infrared-rays sensing garden lamp. More particularly, the present invention relates to a solar-infrared-rays sensing garden lamp that is rechargeable and able to provide power by transferring the solar energy and enable an infrared rays sensing circuit and a lighting unit on the garden lamp at a surface thereof to operate.

2. Descriptions of the Related Art

Conventionally, garden lamps are able to illuminate darkness and outdoor buildings, plants, and trees to be appealing and sensuous at night, therefore people with daylong tiredness can be refreshed by the illuminating effects of garden lamps.

Although the luminaries can decorate the night, conventional garden lamps are powered by power system, and consume superfluous power due to long time illumination, in which the power rate is increased.

Thus it can be seen that the aforementioned products still have many drawbacks and are not good in design, thus the aforementioned products need improvement.

The inventor considers improvement in view of the aforementioned drawbacks of the conventional extension cord plug, and develops the present invention of solar-infrared-rays sensing garden lamp after a long term of research.

SUMMARY OF THE INVENTION

The primary objective of the present invention is to provide a solar-infrared-rays sensing garden lamp that can be charged via solar energy in the daytime, and provide power in the nighttime to save the power rate.

A secondary objective of the present invention is to provide a solar-infrared-rays sensing garden lamp has a plurality of infrared rays sensing circuits and lighting units set on a surface thereof. When one infrared rays sensing circuit is triggered, one corresponding light unit then synchronously illuminates to achieve night lighting.

Another objective of the present invention is to provide a solar-infrared-rays sensing garden lamp that gives off particular sounds when the infrared rays sensing circuit is triggered to alarm the host unusual situations in the garden.

A solar-infrared-rays sensing garden lamp that is able to achieve aforementioned objectives mainly comprises a garden lamp body and a control apparatus connected to the garden lamp body. The control apparatus comprises a solar charge circuit, a power supply, a power supply control circuit, a voice control unit, a speaker, a microphone, an infrared rays sensing circuit, and a lighting unit, in which the infrared rays sensing circuit and the lighting unit are set on the garden lamp at a surface thereof, and keep in substantially equal distances therebetween. In the daytime, the solar charge circuit charges the power supply, and the power is cut off by the power supply control circuit. In the nighttime, the power supply control circuit turns on to make the power supply provide power to the voice control unit, the infrared rays sensing circuit, and the lighting unit to make the infrared rays sensing circuit set on the surface of the garden lamp body operate to sense. Once one infrared rays sensing circuit sense unusual situation, one corresponding light unit is driven to illuminate, and a triggered signal is transmitted to the voice control unit for driving the speaker to generate a corresponding voice to alarm the host the unusual situation.

Besides, the user can turns on the microphone by a setting apparatus to input different kinds of voices to the voice control unit. The user can set up the voices stored in the voice control unit to determine a sequence of playing the voices, or to set up certain corresponding relations with the infrared rays sensing unit.

These features and advantages of the present invention will be fully understood and appreciated from the following detailed description of the accompanying Drawings.

BRIEF DESCRIPTION OF THE DRAWINGS

FIGS. 2A, 2B are a top-view diagrams of the solar-infrared-rays sensing garden lamp of the present invention.

DESCRIPTION OF THE PREFERRED EMBODIMENT

Figure 1:
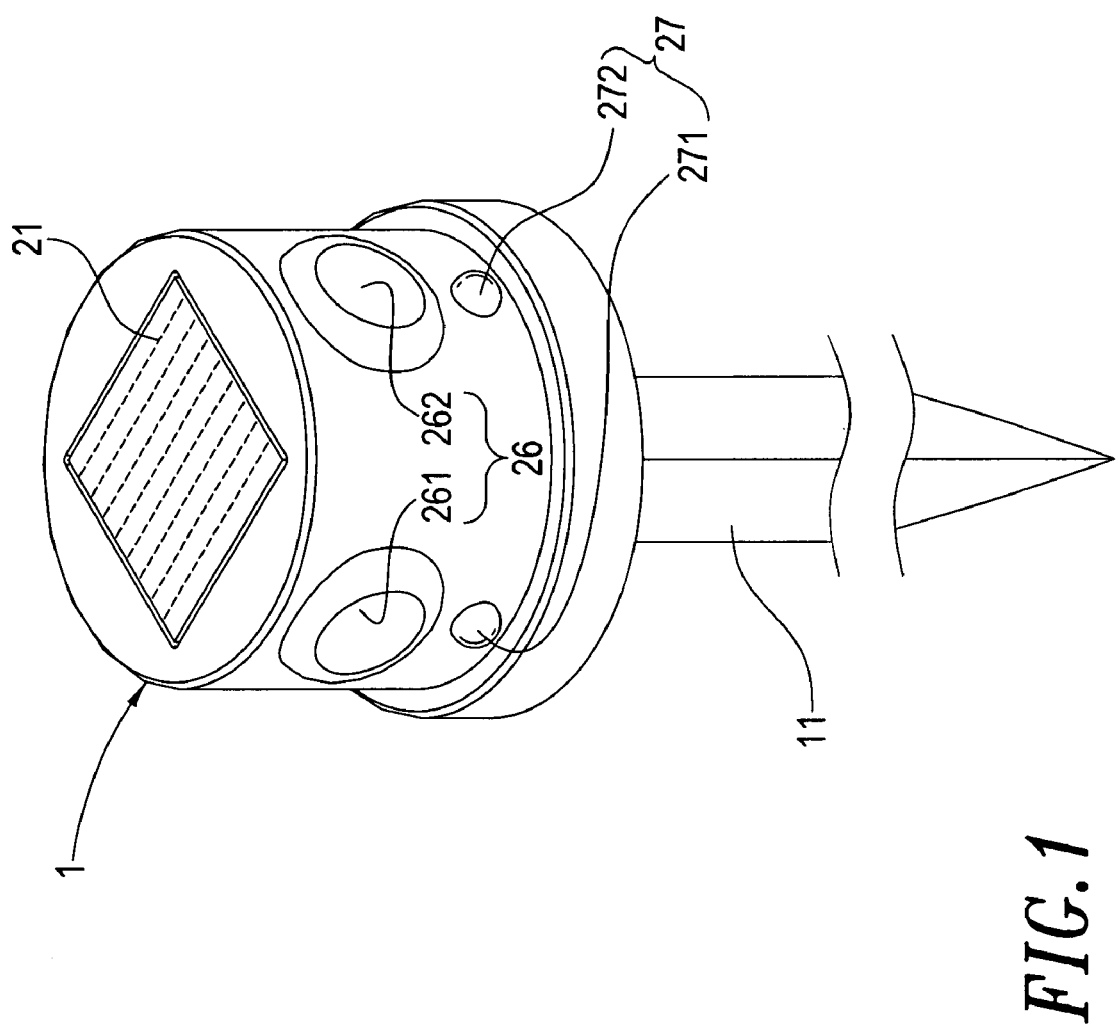
FIG. 1 is a 3-D diagram of the solar-infrared-rays sensing garden lamp of the present invention.
Figure 2A:
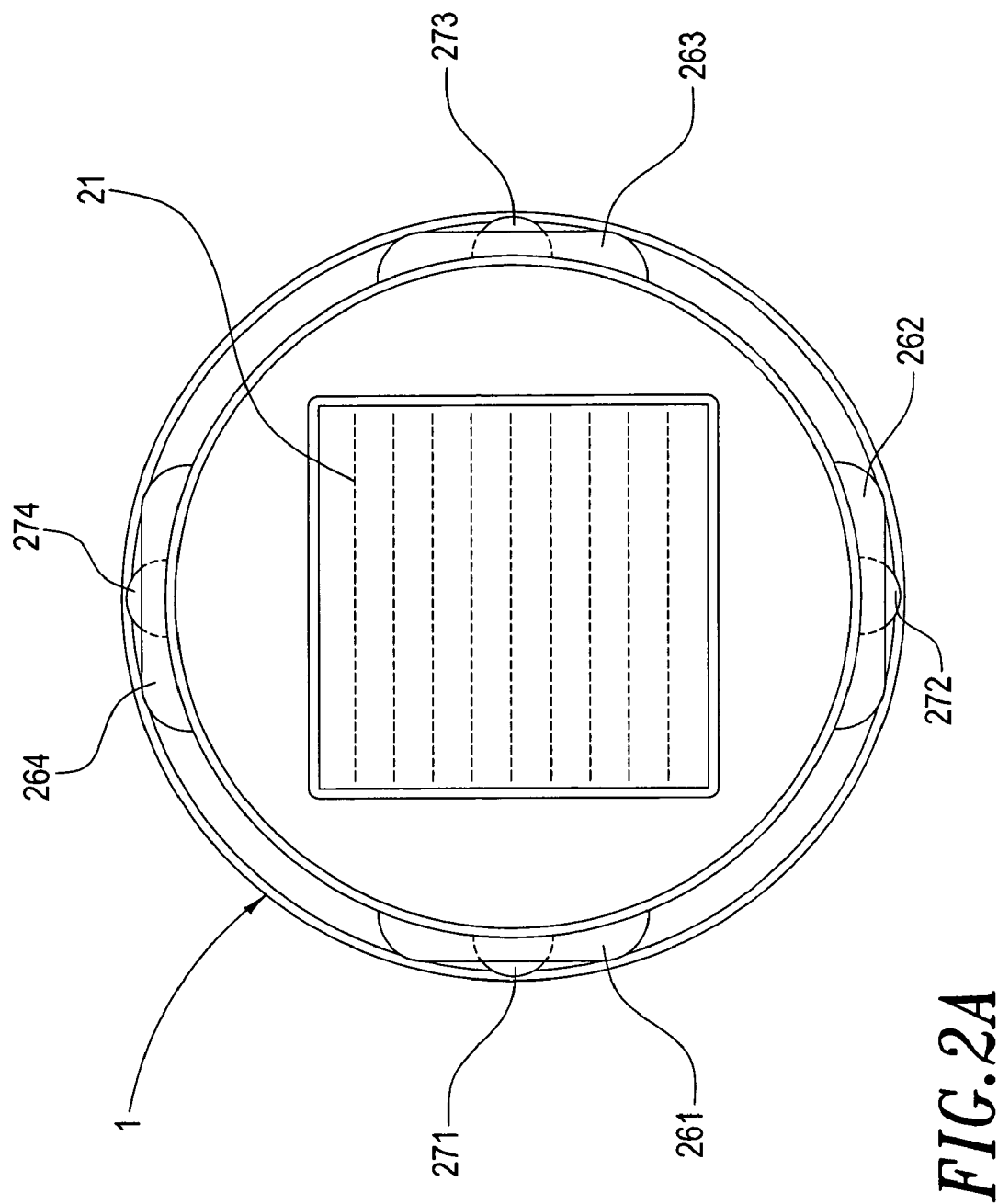

FIGS. 1, 2A, and 2B illustrate a solar-infrared-rays sensing garden lamp of the present invention mainly comprising:

a garden lamp body 1, being set with a taper 11 at a bottom thereof for being inserted in a yard or a garden;

a control apparatus 2, connected to the garden lamp body 1, in which the control apparatus 2 comprises:

a solar charge circuit 21, being configured to receive the solar energy and transfer the solar energy to the electrical energy for being stored in a power supply;

a power supply 22, being connected to the solar charge circuit 21 for storing the power transferred by the solar charge circuit 21 and providing power to a power supply control circuit 23, a voice control unit 24, an infrared rays sending circuit 26 and a lighting unit 27, in which the power supply 22 is selected from groups of a rechargeable battery, a Li-battery, a dry battery, or a conventional battery, and the power supply 22 is set in a battery container 4 of the garden lamp body at a bottom surface thereof;

a power supply control circuit 23 coupled to the solar charge circuit 21 and the power supply 22, in which the power supply control circuit 23 is in OFF state to cut off the power transmitted by the power supply 22 when it receives a charge signal from the solar charge circuit 21; the power supply control circuit 23 is in ON state to ensure the power transmitted by the power supply 22 to the voice control unit 24, the infrared rays sensing circuit 26, and the lighting unit 27 when the power supply control circuit 23 does not receive the charge signal from the solar charge circuit 21; and the objective of charging in the daytime and supplying power in the nighttime is achieved;

a control switch 28 coupled to the power supply control circuit 23 and protruding outward the garden lamp body 1, in which the control switch 28 is manually controlled to turn ON/OFF the power supply control circuit 24 to enable the power supply control circuit 23 in the ON state in the daytime;

a power switch 25 set between the power supply 22 and the power supply control circuit 23, in which the power switch 25 protrudes outward the garden lamp body 1 and is manually controlled to make the power supply 22 provide power;

an infrared rays sensing circuit 26 coupled to the power supply control circuit 23, the lighting unit 27, and the voice control unit 24, the infrared rays sensing circuit 26 comprising a first infrared rays sensor 261, a second infrared rays sensor 262, a third infrared rays sensor 263, and a fourth infrared rays sensor 264, in which the first infrared rays sensor 261, the second infrared rays sensor 262, the third infrared rays sensor 263, and the fourth infrared rays sensor 264 are set on the garden lamp at a surface thereof, protrude outward, and keep in substantially equal distances therebetween for sensing omnibearingly; when any one of the infrared rays sensors 261, 262, 263, 264 protruding outward from the garden lamp body 1 is triggered, the triggered signal is transmitted to the voice control unit 24 and the lighting unit 27;

a lighting unit 27, coupled to the infrared rays sensing circuit 26 and the power supply control circuit 23, comprising a first luminary 271, a second luminary 272, a third luminary 273, and a fourth luminary 274 that are set on the garden lamp body at the surface thereof, protrude outward, and keep in substantially equal distances therebetween for lighting omnibearingly; when any one of the infrared rays sensors 261, 262, 263, 264 is triggered, a corresponding luminary 271, 272, 273, or 274 is driven to generate light;

a voice control unit 24, wherein the voice control unit 24 comprises a voice IC 244, a speaker 241, a setting apparatus 242, and a microphone 243, in which the speaker 241, the setting apparatus 242, and the microphone 243 are coupled to the voice IC 244, the setting apparatus 242 is configured to input setting signals to the voice IC 244 for the voice IC 244 to turn on the microphone 243 in response to commands inputted by the setting apparatus 242, thereby the user can input many kinds of voices that can be played via the speaker 241 to the voice IC 244, and the setting apparatus 242 is configured to set a sequence of playing the voices; the voice IC 244 is coupled to the power supply control circuit 23 and the infrared rays sensing circuit 26 for receiving a trigger signal from any one of the infrared rays sensors 261, 262, 263, or 264 of the infrared rays sensing circuit 26, the voice IC 244 then drives the speaker 241 to play corresponding voice.

Besides, the quantities of the infrared rays sensors 261, 262, 263, and 264, the luminaries 271, 272, 273, and 274 of the infrared rays sensing circuit 26 and the lighting unit 27 respectively are preferred embodiments of the present invention and not intended to limit the scope of the claims.

Figure 3:
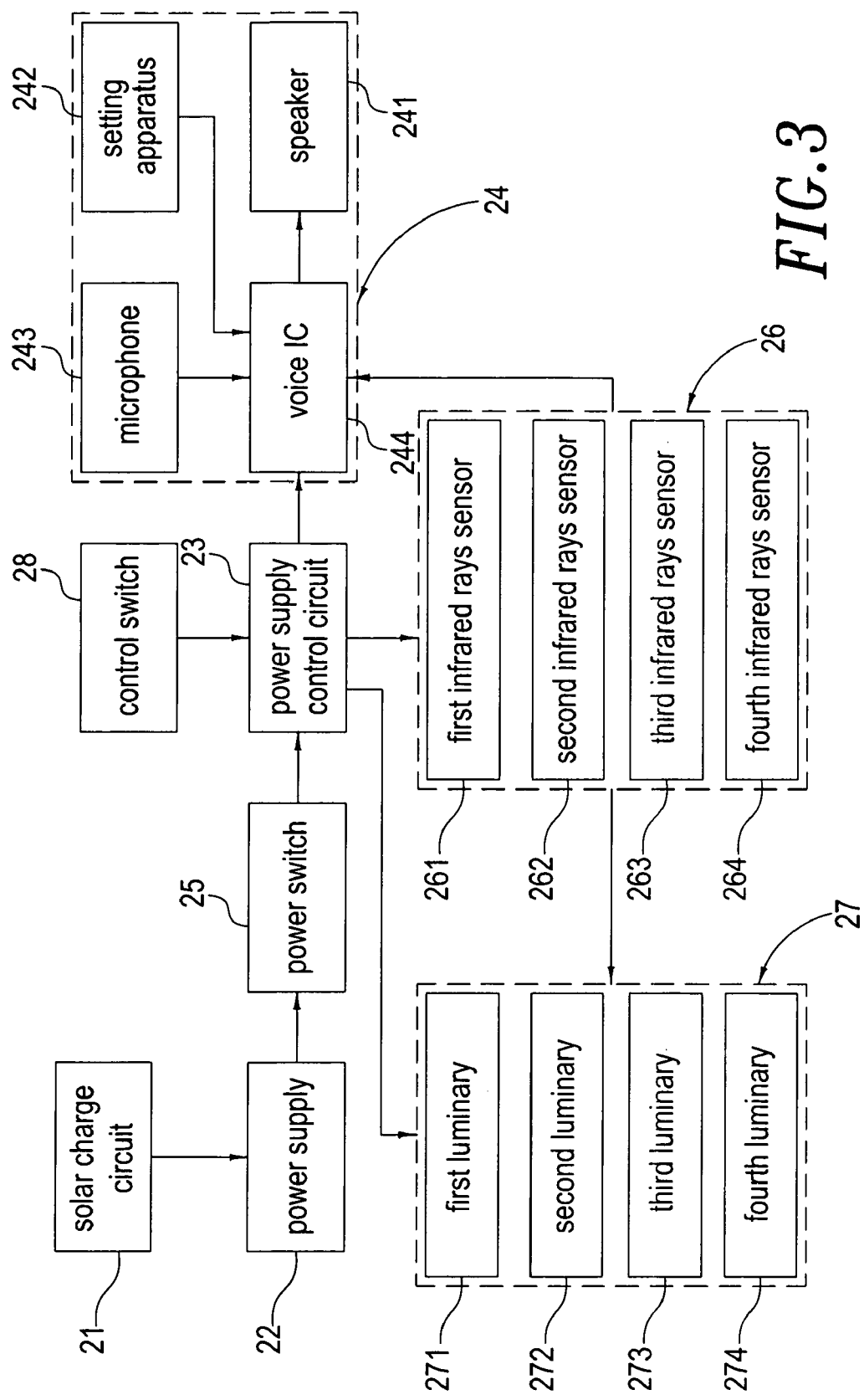
FIG. 3 is a control block diagram of the solar-infrared-rays sensing garden lamp of the present invention.
Figure 4:
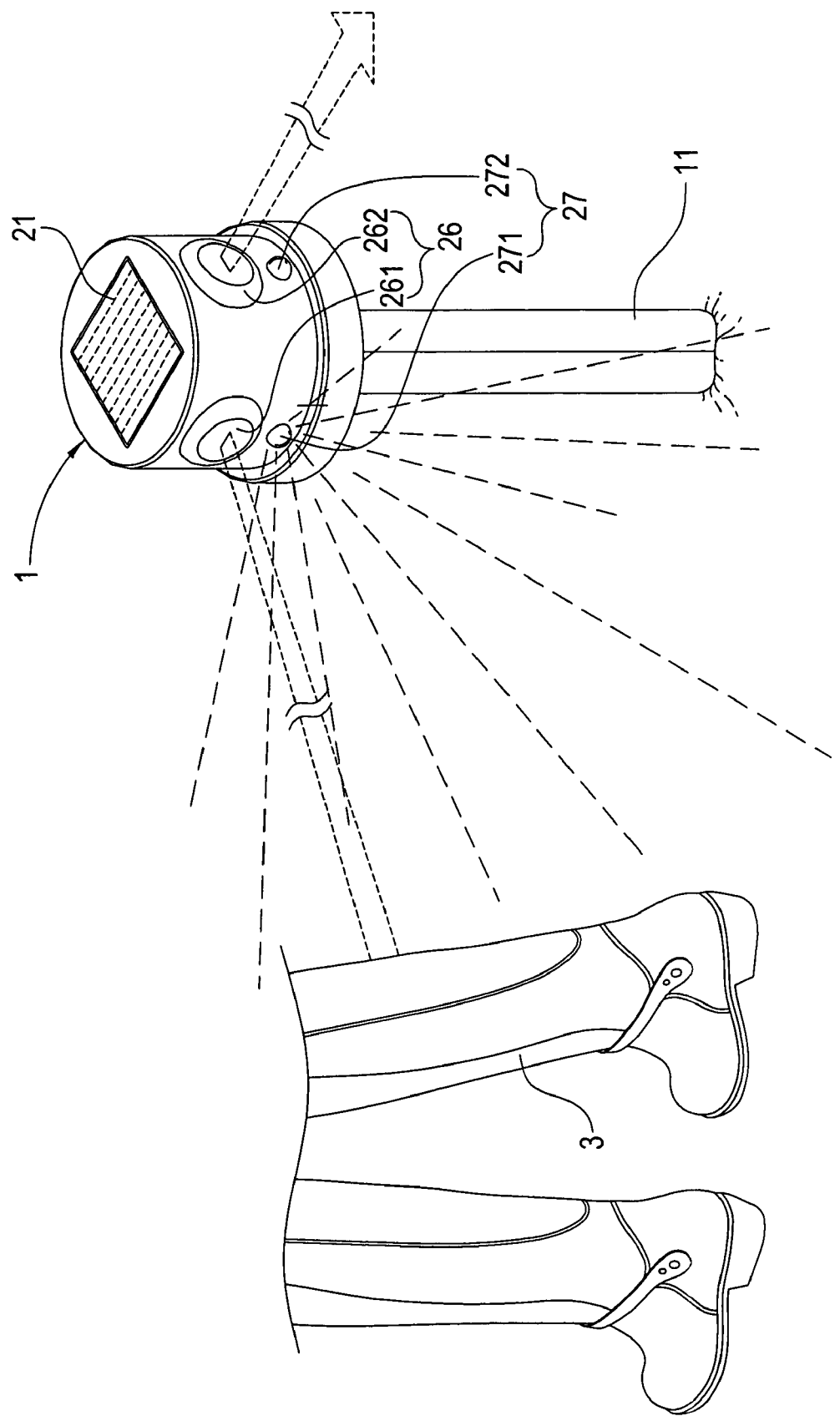
FIG. 4 is a sketch of how the solar-infrared-rays sensing garden lamp of the present invention operates.

Refer to FIG. 3 and FIG. 4, an operation flow chart of the present invention is shown in FIG. 3. In the embodiment, the taper 11 of the garden lamp body 1 is inserted into the ground of the yard of the garden to stand the garden lamp body 1 on the yard or garden. The user can store voices in the voice IC 244 of the voice control unit 24 in advance, and turn on the microphone 243 by driving the voice IC 244 via the setting apparatus 242, therefore the user can store different kinds of voices via the microphone 243, and the voices can be played through the speaker 241.

The power supply control circuit 23 is in OFF state to cut off the power transmitted by the power supply 22 when it receives a charge signal from the solar charge circuit 21 in the daytime, therefore the first infrared rays sensor 261, the second infrared rays sensor 262, the third infrared rays sensor 263, and the fourth infrared rays sensor 264 of the infrared rays sensing circuit 26 are unable to operate.

The power supply control circuit 23 is in ON state to ensure the power transmitted by the power supply 22 to the voice control unit 24, the infrared rays sensing circuit 26, and the lighting unit 27 when the power supply control circuit 23 does not receive the charge signal from the solar charge circuit 21 in the nighttime, therefore the first infrared rays sensor 261, the second infrared rays sensor 262, the third infrared rays sensor 263, and the fourth infrared rays sensor 264 of the infrared rays sensing circuit 26 and the first luminary 271, the second luminary 272, the third luminary 273, and the fourth luminary 274 of the lighting unit 27, and the voice control unit 24 are powered by the power supply 22. The first infrared rays sensor 261, the second infrared rays sensor 262, the third infrared rays sensor 263, and the fourth infrared rays sensor 264 of the infrared rays sensing circuit 26 are able to sense a sensing area, in which the first infrared rays sensor 261 and the first luminary 271 are set on the same side, the second infrared rays sensor 262 and the second luminary 272 are set on the same side, the third infrared rays sensor 263 and the third luminary 273 are set on the same side, the fourth infrared rays sensor 264 and the fourth luminary 274 are set on the same side.

When the first infrared rays sensor 261 of the infrared rays sensing circuit 26 senses a motion of a person 3, it drives the corresponding first luminary 271 to illuminate and synchronously transmits a sensing signal to the voice control unit 24. When the voice control unit 24 determines that the first infrared rays is triggered, it drives the speaker 25 to play corresponding voice for alarming the host the motion of the person 3 in the yard or garden and the host can pay attention on the person 3.

Similarly, when the second infrared rays sensor 262 is triggered, the corresponding second luminary 272 is driven to illuminate, and redundant descriptions are omitted hereinafter.

The solar-infrared-rays sensing garden lamp of the present invention, referring to prior art of references, had advantages as follows:

1. The present invention is able to recharged by the solar energy in the daytime and provide power in the nighttime to save the power rate.

2. The present invention has infrared rays sensing circuits 26 and lighting units 27 set on the garden lamp body 1 at each surface thereof for lighting and sensing omnibearingly, when one infrared rays sensing circuit 26 is triggered, the corresponding lighting unit 27 set on the same side illuminates to achieve night lighting.

3. The present invention is characterized in that the garden lamp body 1 is able to give off particular sounds when the infrared rays sensing circuit 26 is triggered to alarm the host unusual situations in the garden.

The aforementioned detail description is for explaining a particular embodiment of the present invention, and the embodiment is not applied to limit the present invention. The equivalent embodiment of modification after understanding the present invention shall be within the scope of the invention.

As aforementioned, the present invention is novel in technology and advantaged in many effects that the prior arts lack. The present invention conforms to the novelty and non-obviousness of patentability. Please the examiner carefully considering the application of the present invention and allowing the application.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A solar-infrared-rays sensing garden lamp, comprising:
 a garden lamp body, being set with a taper at a bottom thereof;
 a control apparatus, connected to the garden lamp body, the control apparatus comprising:
 a solar charge circuit, being configured to charge a power supply to make the power supply provide power to each circuit apparatus;
 a power supply control circuit, coupled to the solar charge circuit and the power supply, in which the power supply control circuit controls the power supply to provide power according to whether the solar charge circuit is charged;
 an infrared rays sensing circuit, coupled to the power supply control circuit, comprising a plurality of infrared rays sensors that are set on the garden lamp at a surface thereof, protrude outward, and keep in substantially equal distances therebetween for sensing omnibearingly;
 a lighting unit, coupled to the infrared rays sensing circuit and the power supply control circuit, comprising a plurality of luminaries that are set on the garden lamp body at the surface thereof, protrude outward, and keep in substantially equal distances therebetween for lighting omnibearingly;
 thereby when any one of the infrared rays sensors of the infrared rays sensing circuit is triggered,
 a corresponding luminary of the lighting unit is driven to generate light.

2. The solar-infrared-rays sensing garden lamp as claimed in claim 1, wherein the power supply is a rechargeable battery.

3. The solar-infrared-rays sensing garden lamp as claimed in claim 1, wherein a power switch is set between the power supply and the power supply control circuit, the power switch protrudes outward the garden lamp body and is manually controlled to make the power supply provide power.

4. The solar-infrared-rays sensing garden lamp as claimed in claim 1, further comprising a control switch coupled to the power supply control circuit and protruding outward the garden lamp body, in which the control switch is manually controlled to turn on/off the power supply control circuit.

5. The solar-infrared-rays sensing garden lamp as claimed in claim 1, wherein the infrared rays sensing circuit preferably comprises four sets of infrared rays sensors.

6. The solar-infrared-rays sensing garden lamp as claimed in claim 1, wherein the lighting unit preferably comprises four sets of luminaries.

7. A solar-infrared-rays sensing garden lamp, comprising:
 a garden lamp body, being set with a taper at a bottom thereof;
 a control apparatus, connected to the garden lamp body, the control apparatus comprising:
 a solar charge circuit, being configured to charge a power supply to make the power supply provide power to each circuit apparatus;
 a power supply control circuit, coupled to the solar charge circuit and the power supply, in which the power supply control circuit controls the power supply to provide power according to whether the solar charge circuit is charged;
 an infrared rays sensing circuit, coupled to the power supply control circuit, comprising a plurality of infrared rays sensors that are set on the garden lamp at a surface thereof, protrude outward, and keep in substantially equal distances therebetween for sensing omnibearingly;
 a lighting unit, coupled to the infrared rays sensing circuit and the power supply control circuit, comprising a plurality of luminaries that are set on the garden lamp body at the surface thereof, protrude outward, and keep in substantially equal distances therebetween for lighting omnibearingly;
 a voice control unit, coupled to the power supply control circuit and the infrared rays sensing circuit, in which the voice control unit is pre-stored with a plurality of sets of different voices;
 thereby when any one of the infrared rays sensors of the infrared rays sensing circuit is triggered, a corresponding luminary of the lighting unit is driven to generate light, and a trigger signal is synchronously transmitted to the voice control unit, the voice control unit determines the trigger signal and generates a corresponding voice in response to the trigger signal.

8. The solar-infrared-rays sensing garden lamp as claimed in claim 7, wherein the power supply is a rechargeable battery.

9. The solar-infrared-rays sensing garden lamp as claimed in claim 7, wherein a power switch is set between the power supply and the power supply control circuit, the power switch protrudes outward the garden lamp body and is manually controlled to make the power supply provide power.

10. The solar-infrared-rays sensing garden lamp as claimed in claim 7, further comprising a control switch coupled to the power supply control circuit and protruding outward the garden lamp body, in which the control switch is manually controlled to turn on/off the power supply control circuit.

11. The solar-infrared-rays sensing garden lamp as claimed in claim 7, wherein the infrared rays sensing circuit preferably comprises four sets of infrared rays sensors.

12. The solar-infrared-rays sensing garden lamp as claimed in claim 7, wherein the lighting unit preferably comprises four sets of luminaries.

13. The solar-infrared-rays sensing garden lamp as claimed in claim 7, wherein the voice control unit comprises a voice IC, a speaker, a setting apparatus, and a microphone, in which the speaker, the setting apparatus, and the microphone are coupled to the voice IC, the setting apparatus is configured to input setting signals to the voice IC for the voice IC to turn on the microphone in response to commands inputted by the setting apparatus, thereby the user can input many kinds of voices that can be played via the speaker to the voice IC, and the setting apparatus is configured to set a sequence of playing the voices.

14. The solar-infrared-rays sensing garden lamp as claimed in claim 13, wherein the voice IC is coupled to the power supply control circuit and the infrared rays sensing circuit for receiving a trigger signal from any one of the infrared rays sensors of the infrared rays sensing circuit, the voice IC then determines the received signal and then drives the speaker to play corresponding voice.

* * * * *